United States Patent
Tang et al.

(10) Patent No.: US 12,452,204 B2
(45) Date of Patent: Oct. 21, 2025

(54) DNS CONFIGURATION PROVISIONING

(71) Applicant: Lenovo (Beijing) Limited, Beijing (CN)

(72) Inventors: Tingfang Tang, Beijing (CN); Emmanouil Pateromichelakis, Viersen (DE)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/264,789

(22) PCT Filed: Feb. 10, 2021

(86) PCT No.: PCT/CN2021/076592
§ 371 (c)(1),
(2) Date: Aug. 9, 2023

(87) PCT Pub. No.: WO2022/170593
PCT Pub. Date: Aug. 18, 2022

(65) Prior Publication Data
US 2024/0056415 A1 Feb. 15, 2024

(51) Int. Cl.
*H04L 61/4511* (2022.01)
*H04L 61/00* (2022.01)
*H04W 4/50* (2018.01)

(52) U.S. Cl.
CPC .......... *H04L 61/4511* (2022.05); *H04L 61/35* (2013.01); *H04W 4/50* (2018.02)

(58) Field of Classification Search
CPC ....... H04L 61/451; H04L 61/35; H04W 48/17
See application file for complete search history.

(56) References Cited

U.S. PATENT DOCUMENTS

| | | | | |
|---|---|---|---|---|
| 10,972,426 | B1* | 4/2021 | Sinha | H04L 61/4511 |
| 11,979,367 | B2* | 5/2024 | Zhang | H04L 61/4511 |
| 11,991,145 | B2* | 5/2024 | Lee | H04L 67/147 |
| 2016/0037328 | A1* | 2/2016 | Raveendran | H04W 8/08 370/328 |

(Continued)

FOREIGN PATENT DOCUMENTS

| | | |
|---|---|---|
| CN | 109997334 A | 7/2019 |
| CN | 110121892 A | 8/2019 |

(Continued)

OTHER PUBLICATIONS

Huawei, et al., "Update solution #6: Discovery of EAS based on DNS", 3GPP TSG-WG SA2 Meeting #139E e-meeting, S2-2004116, Elbonia [retrieved Aug. 1, 2023]. Retrieved from the Internet <https://www.3gpp.org/ftp/tsg_sa/WG2_Arch/TSGS2_139e_Electronic/Docs/?sortby=date>., Jun. 2020, 8 Pages.

(Continued)

*Primary Examiner* — Chirag R Patel
(74) *Attorney, Agent, or Firm* — FIG. 1 Patents

(57) ABSTRACT

Method and apparatus for improvement of DNS configuration for applications are disclosed. A method performed at a server comprises generating Domain Name System (DNS) information; deciding whether to transmit the DNS information to a User Equipment (UE) or to a network or to both the UE and the network; and transmitting the DNS information for use with at least one application associated with the UE according to the decision.

20 Claims, 8 Drawing Sheets

(56) References Cited

U.S. PATENT DOCUMENTS

| | | | | |
|---|---|---|---|---|
| 2020/0329008 A1* | 10/2020 | Dao | ............... | H04L 61/5007 |
| 2022/0053602 A1* | 2/2022 | Kim | ............... | H04L 5/0055 |
| 2022/0345442 A1* | 10/2022 | Lee | ............... | H04L 67/10 |
| 2023/0047849 A1* | 2/2023 | Ge | ............... | H04L 45/02 |
| 2023/0091077 A1* | 3/2023 | Yao | ............... | H04W 40/20 |
| | | | | 455/456.1 |
| 2023/0239343 A1* | 7/2023 | Ge | ............... | H04L 67/1031 |
| | | | | 709/203 |
| 2023/0362127 A1* | 11/2023 | Korja | ............... | H04L 61/4511 |
| 2023/0379293 A1* | 11/2023 | Muñoz de la Torre Alonso ......... | | |
| | | | | H04L 61/2557 |

FOREIGN PATENT DOCUMENTS

| | | |
|---|---|---|
| CN | 111343092 A | 6/2020 |
| CN | 111345012 A | 6/2020 |

OTHER PUBLICATIONS

PCT/CN2021/076592 , "International Preliminary Report on Patentability", PCT Application No. PCT/CN2021/076592, Aug. 24, 2023, 6 pages.

PCT/CN2021/076592 , "International Search Report and Written Opinion", PCT Application PCT/CN2021/076592, Nov. 16, 2021, 8 Pages.

\* cited by examiner

DNS CONFIGURATION PROVISIONING

FIELD

The subject matter disclosed herein generally relates to wireless communications, and more particularly relates to DNS configuration provisioning.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), data network (DN), DN Access Identifier (DNAI), 5G core (5GC), 5G core network (5GCN), 5G system (5GS), Protocol Data Unit (PDU), PDU Session Anchor (PSA), uplink classifier (UL classifier or ULCL), Domain Name System (DNS), Local DNS Resolver (LDNSR), Edge Application Server (EAS), Session Management (SM), Session Management Function (SMF), non-access stratum (NAS), Protocol Configuration Options (PCO), Service Provider (SP), Multi-access Edge Computing (MEC), Branching Point (BP), data network name (DNN), Single Network Slice Selection Assistance Information (S-NSSAI), Internet Engineering Task Force (IETF), Request For Comments (RFC), Dynamic Host Configuration Protocol (DHCP), Recursive DNS Server (RDNSS), Application Client (AC) and Edge Enabler Client (EEC), Edge Application Server (EAS), Edge Enabler Server (EES), Edge Configuration Server (ECS), Edge Data Network (EDN), Edge Data Network Configuration Server (EDNCS), Key Performance Indicator (KPI), Policy Control Function (PCF), Access and Mobility Management Function (AMF), Application Function (AF), Fully Qualified Domain Name (FQDN), UE Route Selection Policy (URSP), Service and Session Continuity (SSC), User Plane Function (UPF), Application Server (AS), Original Equipment Manufacturer (OEM), Edge Notification Server (ENS), Firebase Cloud Messaging (FMC), Apple Push Notification Service (APNS), Uniform Resource Locator (URL), Representational state transfer (RST or REST).

Edge platform is deployed for providing differentiated application services. Some applications can be accessed via the edge platform from one or more DNAIs. Other applications can be accessed via the public internet (or central DN). And some applications can be accessed via both the edge platform and public internet (or central DN). 5GC supports three connectivity models to enable edge computing: 1) Distributed Anchor Point, 2) Session Breakout, and 3) Multiple PDU sessions, as illustrated in FIG. 1. In 1) Distributed Anchor Point, multiple PDU sessions are used. In 2) Session Breakout, a PDU session may be associated with multiple PDU session anchors (PSAs), in which uplink classifier (UL classifier or ULCL) or IPv6 multi-homing is used. In 3) Multiple PDU sessions, multiple PDU sessions are used.

DNS servers are used to resolve the DNS request and discover the IP address of one suitable Application Server considering the Edge Computing deployment for applications. The 5GC can use LDNSR to decide and forward DNS message to the local DNS server or central DNS server based on related information. The DNS servers can be deployed locally and centrally. LDNSR is an abbreviation of local DNS resolver and acts as an enhanced DNS forwarder. LDNSR is a new function that allows coordination of the EAS Discovery using DNS and the 5GC connectivity. LDNSR facilitates that it is possible to select the DNS server to resolve the DNS query into the EAS closer to the edge in which the UE is deployed In addition, LDNSR may provide information to trigger dynamic insertion of ULCL or BP or local PSA.

The options 1-3 for the EAS discovery using LDNSR are described in FIG. 2.

Option 1: LDNSR is configured as DNS server to the UE during PDU session establishment by SMF via PCO. LDNSR forwards the received UL DNS query, inserting an ECS option, to C-DNS server.

Option 2: LDNSR is configured as DNS server to the UE during PDU session establishment by SMF via PCO. LDNSR forwards the received UL DNS query to L-DNS resolver.

Option 3: The L-DNS resolver (which is different from LDNSR) or L-DNS server can be configured to UE as DNS server for the PDU session. For example, the SPs prefer to own the MEC hosts including edge DNS server as well rather than using local DNS services provided by the network providers.

As mentioned in the above model 2), a PDU Session can be associated with multiple PSA anchors. Accordingly, the PDU session may be associated with multiple IPv6 prefixes. For example, the PDU session may be referred to as multi-homed PDU Session. The multi-homed PDU Session provides access to the Data Network via more than one PDU Session Anchor in order to support selective traffic routing to the DN. According to the existing solutions, before the local BP or local PSA insertion, the LDNSR located centrally can be configured to the UE as DNS server, and the DNS query message is sent to the LDNSR. The DNS response message, if pointed to the local application server, can trigger the local BP or local PSA insertion. After the local BP or local PSA insertion, there are both user plane paths to central DN and local DN.

However, there are following problems for the PDU session with multiple PSA anchors for the case that some applications can be accessed via the central DN and the other applications can be accessed the other DN e.g. local DN, and some applications can be accessed via both the central DN and the local DN.

If the central LDNSR is kept as DNS server after the local BP or local PSA insertion, in order to avoid the DNS spoofing, all subsequent DNS queries are still sent the central LDNSR even if the related DNS server is deployed in local DN and there is local user plane path. It will increase the difficulty and decrease the efficiency for the DNS handling for the DNS queries terminating at the local DNS server.

If the local DNS server or local DNS resolver is configured to the UE, after the local BP or local PSA insertion, in order to avoid the DNS spoofing, all subsequent DNS queries are sent to the local DNS server or local DNS resolver even if the related DNS server is deployed in central DN. Especially in the case that the local DNS server can only process the DNS messages for the application deployed within its own edge environment or the local DN has no direct connection with the central DN, it will increase the difficulty and decrease the efficiency for the DNS handling for the DNS queries terminating at the central DNS server.

Therefore, for the PDU session with multiple PSA anchors, for the case that some applications can be accessed via the central DN and the other applications can be accessed via the other DN e.g. local DN, and some applications can be accessed via both the central DN and the local DN, when each deployed DN has its own preferred DNS server for DNS resolving, it is efficient to deliver the DNS queries to the local DN using local user plane path and to the central DN using central user plane path, so that the DNS server configured to the UE should be set accordingly and let the UE select the appropriate DNS server for DNS resolution.

An existing "5GC support for UE selection of the DNS to use" is specified in clause 6.13 of 3GPP TR 23.748, in which the "DN priorities for appDomains" is configured by AF. The "DN priorities for appDomains" may be used to set the rule precedence of URSP rules or DNS priorities. However, the URSP rules cannot be used for choosing appropriate DNS servers for the PDU session with multiple PSA anchors. The DNS priorities provide DNS priorities per (DNN, S-NSSAI) in 3 ways: 1) via NAS PCO; 2) via Router Advertisement per IETF RFC 8106; and 3) DHCP RDNSS option. In 1) via NAS PCO, the DNS server (list) is configured per UE node. So, it relies on UE implementation for DNS sever selection and the UE may inappropriately select local DNS for central applications and/or central DNS server for local applications due to lack of information for making choice. In 2) via Router Advertisement, RDNSS and DNSSL options are used, in which there is no preference information for one application. So, it relies on UE implementation for DNS sever selection. The central DNS server may be selected even if the application is relocated into the local DN with local DNS server for resolution and vice versa. In 3) DHCP RDNSS option, DNS-recursive-name-server, the Domains and networks and the DHCP option preference field are provided. However, the central DNS server may be selected even if the application is relocated into the local DN with local DNS server for resolution and vice versa. As a whole, the DNS priorities do not have information for one application that needs different DNS servers for DNS resolution.

FIG. 3 illustrates application layer architecture specified in 3GPP TS 23.558. The following components are included: AC (Application Client) and EEC (Edge Enabler Client) on the UE side, and EAS (Edge Application Server), EES (Edge Enabler Server) and ECS (Edge Configuration Server) on the server side. EES provides supporting functions needed for EAS and EEC. EEC provides supporting functions needed for AC(s). ECS provides supporting functions needed for the EEC to connect with an EES. AC is the application resident in the UE performing the client function. EAS is the application server resident in the Edge Data Network, performing the server functions. The AC connects to the EAS in order to avail the services of the application with the benefits of edge computing.

FIG. 4 illustrates an existing "Solution #24: Edge Application Server Discovery using DNS" specified in clause 7.24 of 3GPP TR 23.758, in which the EEC configures or reconfigures the DNS resolver in the UE with the DNS configuration data provided by the EDNCS (i.e. ECS). In step 1, the EEC sends to EDNCS a provisioning request for requesting EDN configuration. The message may include the request for DNS configuration data. In step 2, the EDNCS provides DNS configuration data (e.g. EDN service area, DNS server address and optional EDN domain ID) included in the provisioning response. The DNS configuration data is mapped with EDN service area and EDN connection info. EDN domain ID may be sent by the DNS resolver in the UE. The EDN domain ID is used for the DNS server to identify the EDN that the UE is topologically located in. In step 3, the EEC stores and configures the DNS configuration data (i.e. DNS server address and optional EDN domain ID that are related with EDN service area) for DNS resolver. The EEC indicates the DNS resolver the change of DNS configuration data. When the DNS configuration data is changed, the DNS Resolver may remove the existing DNS cache. In step 4, when the EEC is notified of the UE movement across EDN service area, the EEC reconfigures the DNS configuration for DNS Resolver using DNS configuration data that is previously received from the EDNCS. If the UE is out of the current EDN service area and there is no DNS configuration data in EEC, the EEC may initiate this procedure by sending the provisioning request described in the step 1 of this procedure. The EDNCS (i.e. ECS) provides DNS configuration data to the EEC. The EEC configures the DNS configuration for DNS Resolver using the received DNS configuration data from the EDNCS (i.e. ECS). However, for the case of mixed deployment (e.g. only some of the applications are deployed in the EDN but some other applications are deployed centrally), if the existing DNS configuration can differentiate among applications deployed in the EDN or in the central DN or another EDN, the UE may select the inappropriate DNS server for the requested application. In addition, there is no indication for coordination between the DNS configuration configured via application layer and other ways e.g. via network layer.

"Service provisioning" is specified in clause 8.3 of 3GPP TS 23.558, as illustrated in FIG. 5. The service provisioning allows configuring the EEC with information about available edge computing services, based on the hosting UE's location, service requirements, service preferences and connectivity. This configuration includes the necessary address information for the EEC to establish connection with the EES(s). FIG. 5 illustrates an overview of service provisioning. Service provisioning procedures support the Request/Response model and Subscribe/Notify model. Once provisioned, the EEC of the UE registers with the selected EES(s) from the list of provisioned EES(s) it received from the ECS(s). The UE further consumes the edge computing services and performs various operations such as EAS discovery, edge application communications, application context relocation, etc.

Edge Application Server (EAS) discovery is provided in clause 8.5 of 3GPP TS 23.558. The EAS discovery enables the EEC to obtain information about available EASs of interest. The EAS discovery is based on matching EAS discovery filters provided in the request. Request-response procedure, Subscribe-notify procedures (including Subscription update procedure and Unsubscribe procedure) and Dynamic information subscription procedure are supported between EEC and EES for EAS discovery. FIG. 6 illustrates an example for EAS discovery using Request-response model. It is assumed that the EEC has received information (e.g. URI, IP address) related to the EES, and that the EES is configured with ECSP's policy for EAS discovery. In step 1, the EEC sends an Edge Application Server discovery request to the EES. The Edge Application Server discovery request includes the requestor identifier (EEC ID) along with the security credentials and may additionally include EAS discovery filters to retrieve information about particular Edge Application Server(s) or a category of Edge Application Servers, e.g. gaming applications. In step 2, upon receiving the request from the EEC, the EES checks if the EEC is authorized to discover the requested Edge Application Server(s). The authorization check may apply to an individual Edge Application Server, a category of Edge Application Servers or to the Edge Data Network, i.e. to all the Edge Application Servers. For example, if the UE is located outside the Geographical or Topological Service Area of an EAS, then the EES shall not include this EAS in the discovery response. In step 3, if the processing of the request was successful, the EES sends an EAS discovery response to the EEC, which includes information about the discovered Edge Application Servers. For discovered Edge Application Servers, this includes endpoint information. Depending on the EAS discovery filters received in the Edge Application Server discovery request, the response may include additional information regarding matched capabilities, e.g. service permissions levels, Application Client locations(s) that the Edge Application Servers can support, KPIs, etc. Upon receiving the Edge Application Server discovery response, the EEC uses the endpoint information for routing of the outgoing application data traffic to EAS(s), as needed, and may provide necessary notifications to the Application Client(s). The EEC may cache the EAS information (e.g. EAS endpoint) for subsequent use and avoid the need to repeat step 1. If the Lifetime IE is included in the response, the Edge Enabler Client may cache the Edge Application Server information only for the duration specified by the Lifetime IE.

Under the application layer architecture, in the related service procedures (e.g. "Service provisioning" and "EAS discovery"), the ECS provides service provisioning information to the EEC, and the EEC uses the related information to interact with EES to retrieve the EAS information for accessing the service. The EAS is included in the discovery response or notification message. A list of EASs may be included with additional information regarding matched capabilities (e.g. service permissions levels, Application Client locations(s) that the Edge Application Servers can support, KPIs, etc) to make the UE select the appropriate EAS. However, the additional information (e.g. DNS information) may not be exposed by the EAS, and in some cases the target EAS is preferred to be decided by the application server side but not by the UE e.g. using DNS mechanism with the DNS information provided via application layer, however, the DNS information is not provided in this solution. As a whole, the DNS information is not provided in the application layer although the criteria for the application related DNS configuration is available in the application layer.

In summary, there is no solution for coordination between the DNS configuration configured via application layer and other ways e.g. via network layer.

In addition, for application layer mechanism, in the case that mixed deployment e.g. only some of the applications are deployed in the EDN but some other applications are deployed centrally, and the existing DNS configuration can differentiate among applications deployed in the EDN or in the central DN or another EDN, the UE may select the inappropriate DNS server for the application requested. The DNS configuration can only be provided by the ECS. However, the ECS may be provided by different provider than that of the EES while the EES provider may have its own DNS configuration. It is necessary that EES could provide the DNS configuration.

Moreover, for network layer mechanism, while central and local DNS servers for DNS resolving are deployed, it is efficient to deliver the DNS queries to the local DN using local user plane path and to the central DN using central user plane path, so that the DNS servers configured to the UE should be set accordingly to include the local DNS server and central DNS server and let the UE select the appropriate DNS server for DNS resolution.

The purpose of the present invention is to improve DNS configuration for applications.

BRIEF SUMMARY

Method and apparatus for improvement of DNS configuration for applications are disclosed.

In one embodiment, a method performed at a server comprises generating Domain Name System (DNS) information; deciding whether to transmit the DNS information to a User Equipment (UE) or to a network or to both the UE and the network; and transmitting the DNS information for use with at least one application associated with the UE according to the decision.

In some embodiment, the method further comprises receiving a DNS configuration support indication from the UE, wherein the DNS configuration support indication indicates a preference of whether to use the DNS information transmitted from the server or to use the DNS information transmitted from the network. In addition, a DNS configuration support indication, which indicates a preference of whether to use the DNS information transmitted from the server or to use the DNS information transmitted from the network, is provided by the server and the DNS configuration support indication is included in the DNS information. The deciding whether to transmit the DNS information to the UE or to the network or to both the UE and the network is based on a DNS configuration support indication which may be the DNS configuration support indication received from the UE or the DNS configuration support indication decided by the server. The DNS configuration support indication decided by the server may be decided according to the server side policy and/or the DNS configuration support indication received from the UE.

In some embodiment, the server can be an Edge Configuration Server (ECS). Accordingly, the DNS information is transmitted to the UE as part of EDN configuration information, or part of EDN connection information, or part of Edge Enabler Servers configuration information. The can be alternatively an Edge Enabler Server (EES). Accordingly, the DNS information is transmitted to the UE as a new parameter indicating a related server configuration. Further, the DNS information may be alternatively transmitted to the UE via a notification service. The notification service comprises one or more of: an Original Equipment Manufacturer (OEM) notification service, an EDGE notification service, a web-socket Application Programming Interface (API), and a Representational State Transfer (RESTful) API.

The DNS information may be transmitted to a 5G Core (5GC) network via an Application Function (AF) request or parameter provisioning procedure. The 5GC network may transmit the DNS information via the network layer mechanism. If an updated DNS information is generated, the updated DNS information can be transmitted to the UE either directly via the application layer or indirectly via the network layer.

In another embodiment, a method performed at a UE comprises receiving Domain Name System (DNS) information from a server or from a network or from both the server and the network; deciding DNS information from the received DNS information to be used for selecting a DNS server for use with an application associated with the UE; and selecting the DNS server based on the decided DNS information.

In some embodiment, the method further comprises transmitting a DNS configuration support indication to the server, wherein the DNS configuration support indication indicates a preference of whether to use the DNS information received from the server or to use the DNS information received from the network. In addition, a DNS configuration support indication, which indicates a preference of whether to use the DNS information received from the server or to use the DNS information received from the network, is provided by the server and the DNS configuration support indication is included in the received DNS information. The DNS information to be used for selecting the DNS server may be decided based on a DNS configuration support indication, which can be the DNS configuration support indication transmitted to the server, and/or the DNS configuration support indication provided by the server (which is included in the received DNS information).

In one embodiment, a UE comprises: a processor; and a receiver coupled to the processor, wherein the receiver is configured to receive Domain Name System (DNS) information from a server or from a network or from both the server and the network; and the processor is configured to decide DNS information from the received DNS information to be used for selecting a DNS server for use with an application associated with the UE; and to select the DNS server based on the decided DNS information.

In another embodiment, a server comprises a processor; and a transmitter coupled to the processor, wherein the processor is configured to generate Domain Name System (DNS) information, and to decide whether to transmit the DNS information to a User Equipment (UE) or to a network or to both the UE and the network; and the transmitter is configured to transmit the DNS information for use with at least one application associated with the UE according to the decision.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
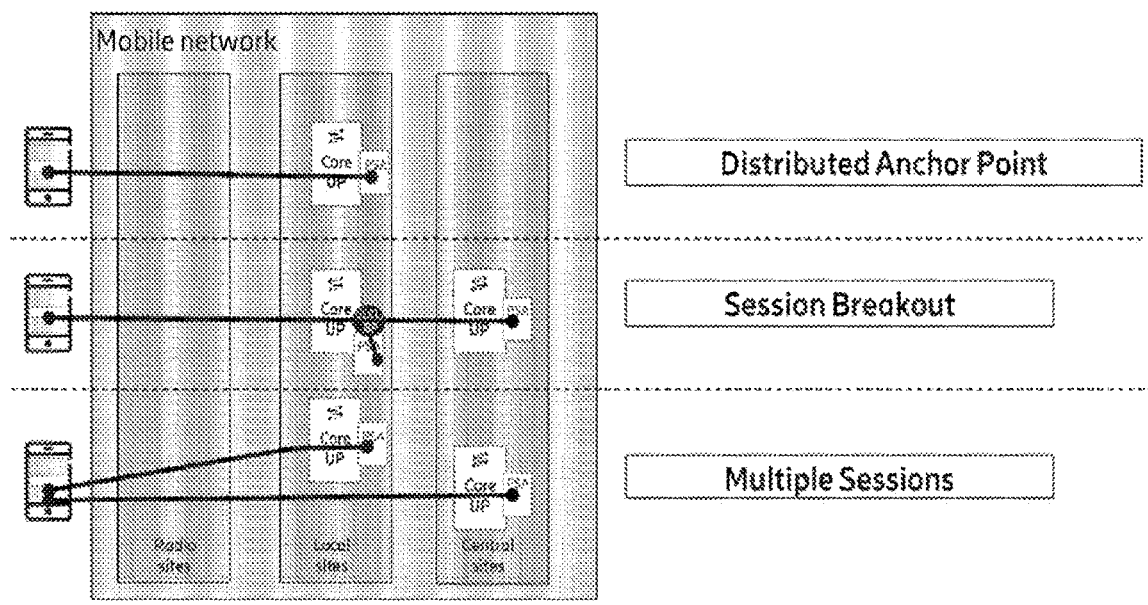
FIG. 1 illustrates 5GC connectivity models for edge computing.
Figure 2:
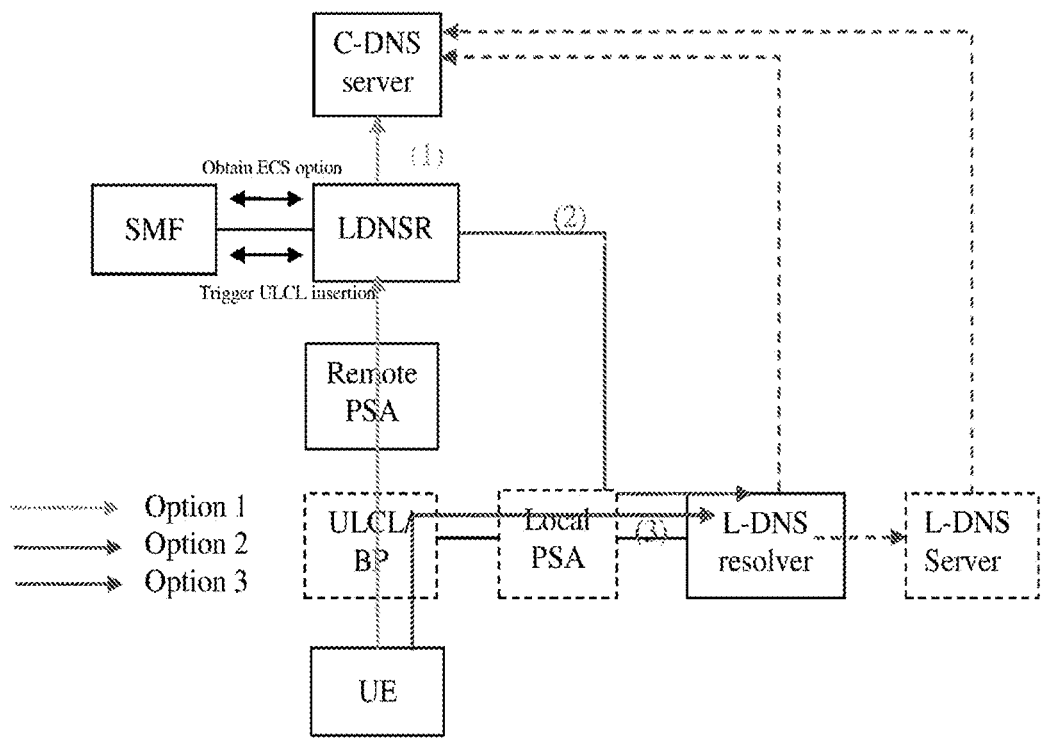
FIG. 2 illustrates options for EAS discovery using LDSNR for PDU session breakout.
Figure 3:
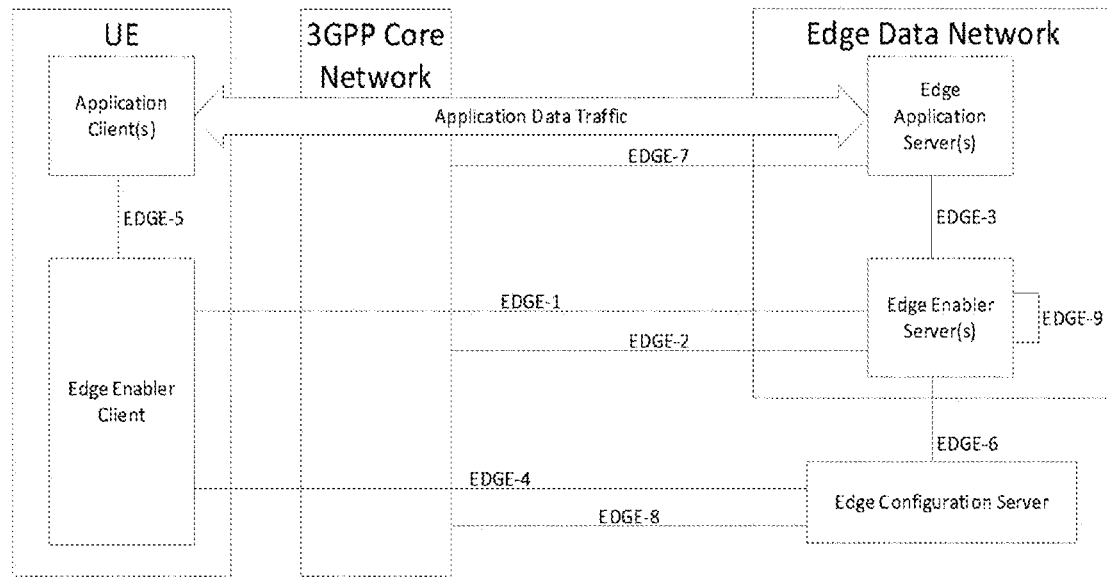
FIG. 3 illustrates application layer architecture.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 4:
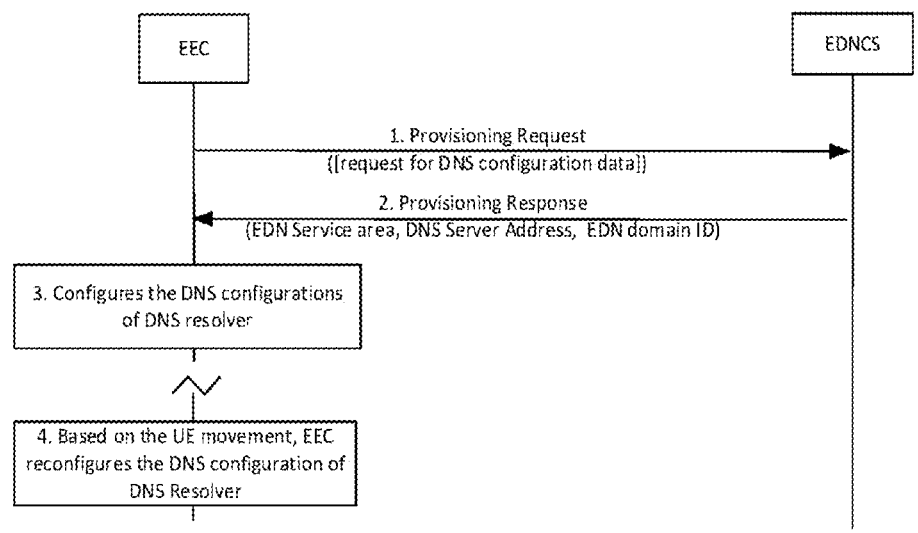
FIG. 4 illustrates an existing "Solution #24: Edge Application Server Discovery using DNS"
Figure 5:
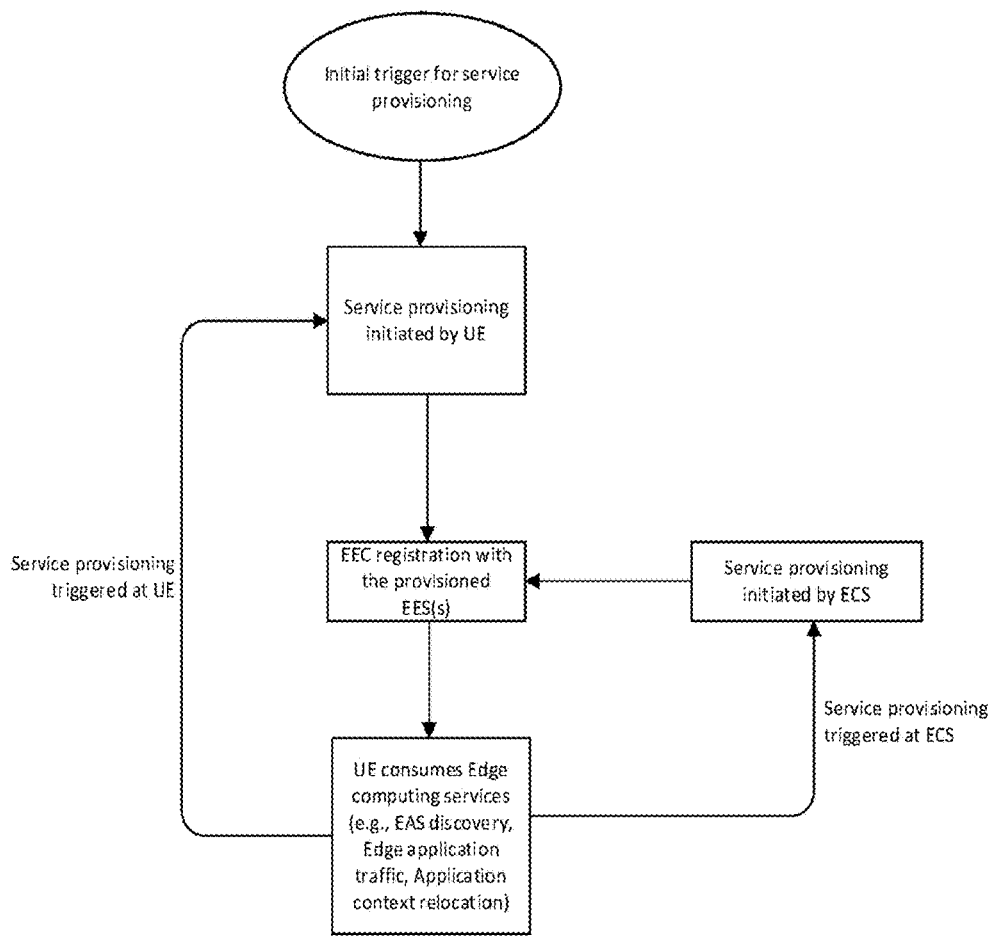
FIG. 5 illustrates "service provisioning" procedure.
Figure 6:
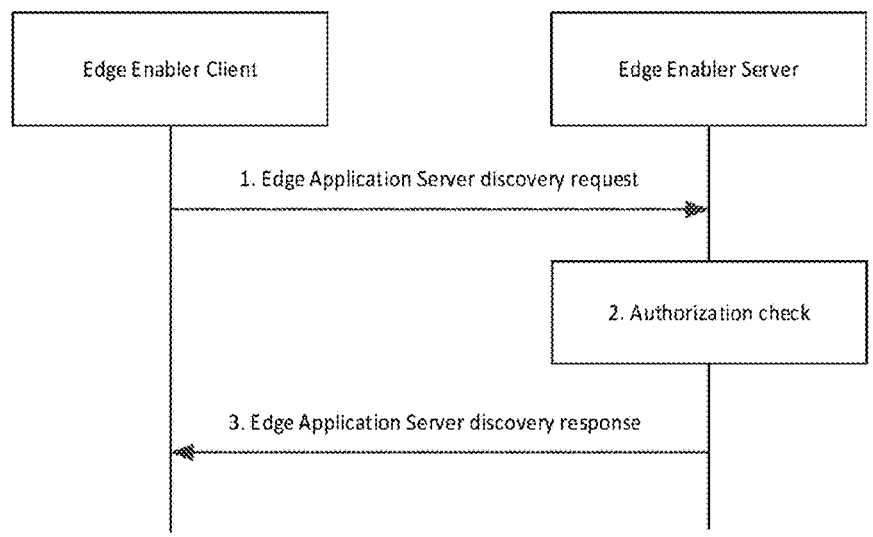
FIG. 6 illustrates an example for EAS discovery using Request-response model.

According to a first embodiment, the application layer architecture illustrated in FIG. 4 is used. The DNS configuration is provisioned by ECS. The first embodiment assumes that the EEC has been pre-configured with or has discovered the address (e.g. URI) of the ECS; the EEC has been authorized to communicate with the ECS; the UE Identifier is either preconfigured or resulted from a successful authorization; the ECS is configured with ECSP's policy for service provisioning with DNS information; and the DNS information has been configured to the ECS.

Figure 7:
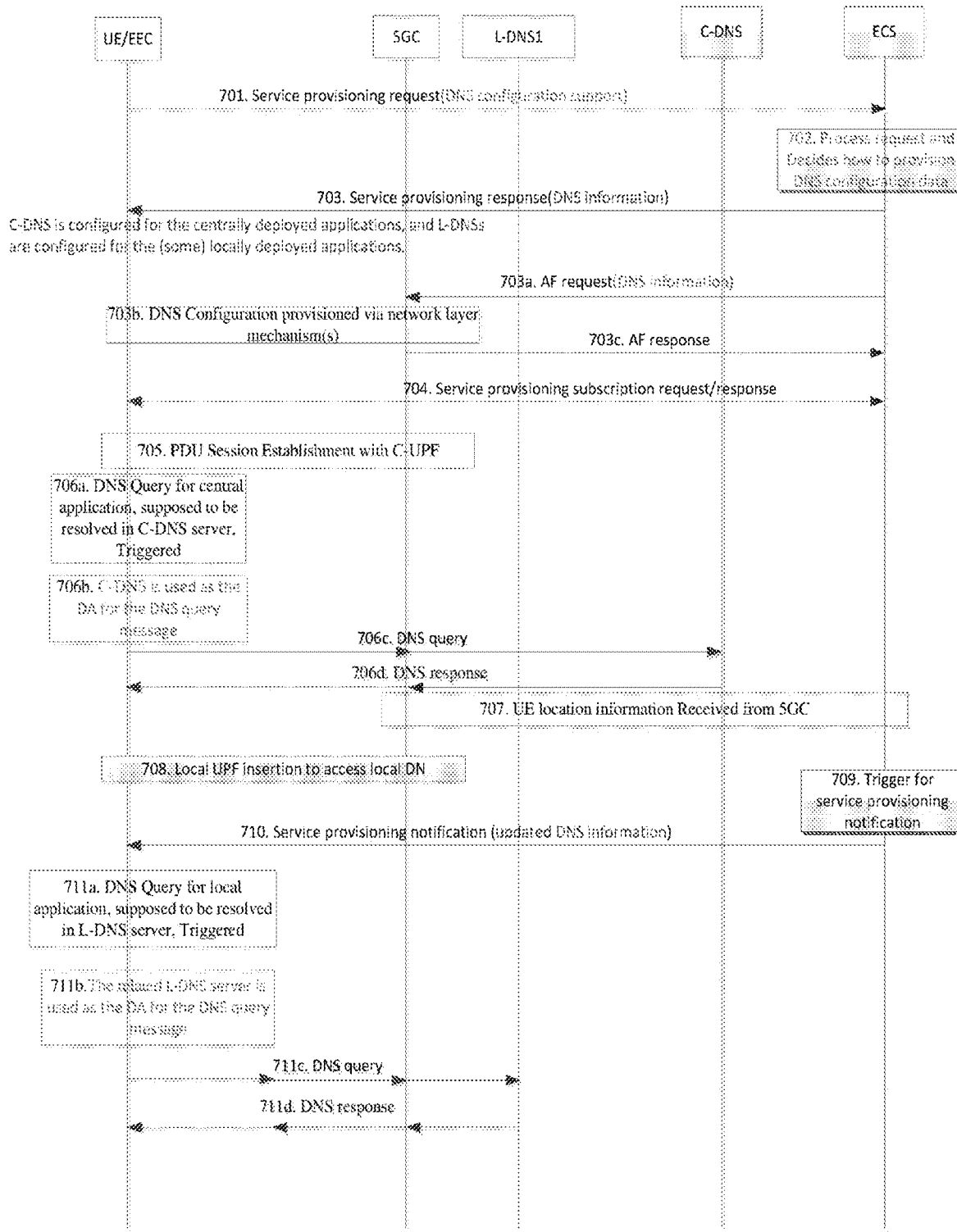
FIG. 7 illustrates procedures according to a first embodiment.

In step 701 of FIG. 7, the Edge Enabler Client (EEC) of the UE sends a service provisioning request to the Edge Configuration Server (ECS). The service provisioning request may include the UE identifier such as GPSI, UE location and Application Client profile(s) information. A DNS configuration support indication may be included in the service provisioning request to indicate the ECS that how the EEC (or UE) supports handling DNS configuration. The DNS configuration support indication may be included in the Application Client Profile(s) as shown in Table 1.

corresponding DNS configuration data via the less preferred way can also be provided to the UE. The DNS configuration data on the UE can include one or more of the DNS information received from the server via application layer, the DNS information received from the network via network layer (received from the server on the application side or configured by the network provider), or the DNS information configured locally on the UE.

In step 702 of FIG. 7, upon receiving the request, the Edge Configuration Server (ECS) performs an authorization check. The ECS determines the EES information. The Edge Configuration Server also determines other information that

TABLE 1

Application Client Profile

| Information element | Status<br>O: optional;<br>M: Mandatory | Description |
| --- | --- | --- |
| Application Client ID | M | Identity of the Application Client. |
| Application Client Type | O | The category or type of Application Client (e.g. V2X). This is an implementation specific value. |
| Preferred ECSP list | O | When used in a service provisioning request, this IE indicates to the ECS which ECSPs are preferred for the AC. The ECS may use this information in the selection of EESs. |
| Application Client Schedule | O | The expected operation schedule of the Application Client (e.g. time windows) |
| Expected Application Client Geographical Service Area | O | The expected location(s) (e.g. route) of the hosting UE during the Application Client's operation schedule. This geographic information can express a geographic point, polygon, route, signalling map, or waypoint set. |
| Service Continuity Support | O | Indicates if service continuity support is required or not for the application. |
| DNS configuration support | O | Indicates how DNS configuration is supported in the UE. |
| List of EASs | O | List of EAS that serve the Application Client along with the service KPIs required by the Application Client |
| >EAS ID | M | Identifier of the EAS |
| >Application Client Service KPIs | O | KPIs required in order for Application Clients to receive services from the EAS, as described in Table 8.2.3-1 |

The DNS configuration support indication indicates the support of the DNS configuration. The preferred way for using DNS information can also be optionally included or implied in the DNS configuration support indication. If the indication indicates that the DNS configuration via application layer is required and preferred to be used, the ECS provides the DNS information (DNS configuration) via application layer, and the received DNS configuration via application layer will be used for the DNS resolution, which may override the DNS configuration data from other ways such as from the network layer. If the indication indicates that the DNS configuration via network layer is required and preferred to be used, when the DNS configuration is obtained, the ECS interacts with 5GC to inform the network about the DNS configuration. Optionally, the ECS can also provide the DNS configuration via application layer, but the received DNS configuration received via network layer will be used by the UE for DNS resolution. The DNS configuration support indication can be alternatively named as DNS configuration indicator or other names. No matter what name is used, it indicates that the preference of whether to use the DNS configuration via application layer from a server or via network layer from the network. While one way is preferred, the corresponding DNS configuration data should be provided via the preferred way, and optionally, the needs to be provided, e.g. identification of the Edge Data Network, topological service area information (for LADN), Edge Enabler Server endpoints. The DNS information (i.e. DNS configuration) may also be generated by the ECS. The DNS information identifies and configures one or more DNS servers for at least one application. In particular, the DNS information includes a list of DNS servers for the applications, e.g. FQDNs. Optionally, the DNS information further includes related validation criteria, which represents the criteria to be considered when the DNS server is selected. For example, for the case that the FQDN for one application should be resolved by DNS server 1 while the application and related DNS server are deployed centrally and DNS server 2 while the application and related DNS server are deployed locally, the DNS server 2 should be present with the validation criteria, e.g. location criteria indicating a local service area. The DNS information may be configured for EDN. For example, one or more EDNs can deploy its dedicated DNS server(s) for DNS resolving for all the applications deployed within the EDN(s). The DNS information may alternatively be configured per application. For example, specific applications have specific DNS configuration for DNS server(s).

In the previous and following descriptions, "DNS information", "DNS configuration" and "DNS configuration data" refer to the same concept, although they may be used in different contexts.

If the DNS configuration support indication is not included in the service provisioning request, the ECS (Note that the ECS can be regarded as the server side) can decide the DNS configuration support indication. Moreover, even if the DNS configuration support indication is included in the service provisioning request to indicate how the EEC (or UE) supports handling DNS configuration, the ECS (i.e. the server side) can decide another DNS configuration support indication to override the DNS configuration support indication provided in the service provisioning request.

Moreover, if the preferred way for using DNS information is not included in the DNS configuration support indication, the ECS (i.e. the server side) can decide the preferred way for using DNS information for the UE. Even if the preferred way for using DNS information is included in the DNS configuration support indication, the ECS (i.e. the server side) can decide another preferred way for using DNS information to override the received preferred way for using DNS information.

The ECS (i.e. the server side) may decide the DNS configuration support indication or the preferred way for using DNS information based on the policy of application on the server side (e.g. provided by the ECS provider) and/or the indication from the UE.

Based on the DNS configuration support indication either received from the UE or decided on the server side, or the preferred way for using DNS information, the ECS should transmit the DNS information to the UE (or EEC) via the preferred way. Optionally, the ECS may also transmit the DNS information to the EEC or UE via the less preferred way. The DNS configuration support indication (decided by the ECS) indicating the UE that the DNS information received via the preferred way has higher precedence or the DNS information received via the less preferred way has lower precedence, or the preferred way for using DNS information may be optionally transmitted to the UE (or EEC), as part of the DNS information or as a standalone parameter. The DNS information, and/or DNS configuration support indication or the preferred way for using DNS information listed above are transmitted to the EEC or the network, means that the related information is generated by the ECS and provided to the EEC or the network.

The DNS configuration support indication received from the UE or provided by the ECS to be transmitted to the EEC or the network can have different names or can be packaged into different parameters. In any case, it indicates how the EEC (or UE) supports handling DNS configuration, e.g. the UE preference of whether to use the DNS information received from the server (ECS) or to use the DNS information received from the network.

For example, if the ECS makes decision that the DNS configuration via application layer is preferred, the ECS provisions the DNS information via application layer to the UE, optionally with the DNS configuration support indication indicating the UE that the DNS information received via application layer by the UE is preferred or has higher precedence. Optionally, the ECS may also transmit the DNS information to the UE via network layer mechanisms (e.g. the ECS interacting with 5GC to inform the network about the DNS configuration data, and the network providing the DNS configuration data to the UE via network layer mechanism(s)), with the DNS configuration support indication indicating the UE that the DNS information received via network layer is less preferred or has lower precedence.

For another example, if the ECS makes decision that the DNS configuration via network layer is preferred, the ECS provisions the DNS information to the UE via network layer to the UE indirectly via the network layer e.g. 5G network, optionally with the DNS configuration support indication indicating the UE that the DNS information received via network layer is preferred or has higher precedence. Optionally, the ECS may also transmit the DNS information to the UE via application layer, with the DNS configuration support indication indicating the UE that the DNS information received via application layer is less preferred or has lower precedence.

The following procedures give embodiment of the case that the ECS provisions the DNS information via application layer to the EEC (UE), optionally with the DNS configuration support indication indicating the UE that the DNS information received via application layer has higher precedence or lower precedence (step 703), and the ECS provisions the DNS configuration to the UE via network layer to the UE indirectly via the network layer e.g. 5G network, optionally with the DNS configuration support indication indicating the UE that the DNS configuration received via network layer has higher precedence or lower precedence (step 703*a*, 703*b* and 703*c*).

In step 703 of FIG. 7, if the processing of the request is successful, the ECS responds to the EEC's request with a service provisioning response which includes a list of Edge Data Network configuration information, e.g. identification of the Edge Data Network, topological service area information (for LADN), and the required information (e.g. URI, IP address) for establishing a connection to the Edge Enabler Server. If the ECS makes decision for providing DNS configuration via application layer in step 702, the DNS information is included in the service provisioning response.

Table 2 gives one example of the DNS server information contained in the service provisioning response. If the DNS server is configured per EDN, the DNS server information can be included as sub-parameter of EDN connection information (i.e. part of EDN connection information). The DNS server information includes the list of DNS servers and the DNS servers serve all the applications of the UEs deployed within the service area of the EDN. If the DNS server is configured per the service area of EES, the DNS server information can be included as sub-parameter of List of Edge Enabler Servers (i.e. part of Edge Enabler Servers configuration information). The DNS server information includes the list of DNS servers and the DNS servers serve all the applications of the UEs deployed within the service area of the EES. The DNS information may also be configured per application or for specific applications, for example, specific applications have specific DNS configuration, with the application IDs as part of the DNS information.

TABLE 2

Service provisioning response

| Information element | Status<br>O: optional;<br>M: Mandatory;<br>C: Conditional | Description |
|---|---|---|
| Successful response | O | Indicates that the service provisioning request was successful. |
| >List of EDN configuration information | M | List of Edge Data Networks. |
| >>EDN connection information (NOTE 1) | M | Information required by the UE to establish connection with the Edge Data Network. |
| >>>DNN/APN | M | Data Network Name/Access Point Name |
| >>>S-NSSAI | O | Network Slice information |
| >>>EDN Topological Service Area (NOTE 2) | O | A list of Cell IDs or List of TAIs. The EDN serves UEs that are connected to the Core Network from one of these cells. See possible formats in Table 8.2.7-1. |
| >>>DNS server information | C | One or more DNS servers. The DNS server(s) serve the UEs that are connected to the EDN for DNS resolution. |
| >>List of Edge Enabler Servers | M | List of Edge Enabler Servers of the Edge Data Network. |
| >>>EES ID | M | The identifier of the EES |
| >>>EES Endpoint | M | The endpoint address (e.g. URI, IP address) of the EES |
| >>>Edge Application Server IDs (NOTE 3) | O | List of Edge Application Server IDs registered with the EES. |
| >>>ECSP info | O | Information for Edge Computing Service Provider |
| >>>EES Topological Service Area | O | The list of Cell IDs (or TAIs) serviced by this EES. EECs of UEs that are connected to the Core Network from a cell that is not in this list shall not be served by this EES. |
| >>>EES Geographical Service Area | O | The area being served by the EES in Geographical values (as specified in subclause 7.3.3.3) |
| >>>List of EES DNAI(s) | O | DNAI(s) associated with the EES/EAS. This IE is used as Potential Locations of Applications in clause 5.6.7 of 3GPP TS 23.501 [2]. |
| >>>DNS server information | C | One or more DNS servers. The DNS server(s) serve the UEs that are connected to the EES to access the related application for DNS resolution. |
| . . . | | |

Table 3 gives another example of the DNS server information contained in the service provisioning response. The DNS server information can be included as sub-parameter of List of EDN configuration information (i.e. part of EDN configuration information). The DNS server information include the list of DNS servers and the specific applications which indicates the DNS servers serve the specific applications deployed within the service area of the EDN or EES. If multiple DNS servers are deployed for the same application within the same area, other criteria like the precedence (for determining the order of the DNS Server selection rules) can be included.

TABLE 3

Service provisioning response

| Information element | Status<br>O: optional;<br>M: Mandatory;<br>C: Conditional | Description |
|---|---|---|
| Successful response | O | Indicates that the service provisioning request was successful. |
| >List of EDN configuration information | M | List of Edge Data Networks. |
| >>EDN connection information (NOTE 1) | M | Information required by the UE to establish connection with the Edge Data Network. |
| >>>DNN/APN | M | Data Network Name/Access Point Name |
| >>>S-NSSAI | O | Network Slice information |
| >>>EDN Topological Service Area (NOTE 2) | O | A list of Cell IDs or List of TAIs. The EDN serves UEs that are connected to the Core Network from one of these cells. See possible formats in Table 8.2.7-1. |
| >>List of Edge Enabler Servers | M | List of Edge Enabler Servers of the Edge Data Network. |
| . . . | | |

TABLE 3-continued

Service provisioning response

| Information element | Status<br>O: optional;<br>M: Mandatory;<br>C: Conditional | Description |
|---|---|---|
| >>>EES Topological Service Area | O | The list of Cell IDs (or TAIs) serviced by this EES. EECs of UEs that are connected to the Core Network from a cell that is not in this list shall not be served by this EES. |
| >>>EES Geographical Service Area | O | The area being served by the EES in Geographical values (as specified in subclause 7.3.3.3) |
| >>>List of EES DNAI(s) | O | DNAI(s) associated with the EES/EAS. This IE is used as Potential Locations of Applications in clause 5.6.7 of 3GPP TS 23.501 [2]. |
| >>List of DNS server information | C | The DNS server(s) information for the DNS servers that serve the UEs that are connected to the EDN for DNS resolution. |
| >>>DNS server Endpoint | O | The endpoint address (e.g. IP address) of the DNS server. |
| >>>Application IDs | O | The Identification for the applications requiring resolution by the specified DNS server, e.g. list of FQDNs. |
| >>>DNS server Service Area | O | The area being served by the DNS server in geographical values or topological values. |
| >>>Precedence | O | The order that the server is selected in the UE. |
| >>>DNS configuration support | O | Indicates how DNS configuration is supported in the UE. |
| ... | | |

If the ECS makes decision for providing DNS configuration data via network layer in step 702 of FIG. 7, steps 703a, 703b and 703c are performed to transmit the DNS information to the UE via network layer.

In step 703a of FIG. 7, the ECS gets the DNS configuration data and interacts with 5GC (e.g. with AF) via an Application Function (AF) request or parameter provisioning procedure.

In step 703b of FIG. 7, the 5GC provides the DNS configuration data to the UE via network layer by e.g. NAS PCO, UE policy rule or RA message.

In step 703c of FIG. 7, the 5GC (e.g. AF) responds the ECS.

In the above example, 5GC is an example of network via which can access MEC platform. 5GC is the 5G core network within 5G system (5GS), it is also called as 5GCN. If other network is used to access the applied application DN (e.g. MEC platform), the transmitting of DNS information is executed via the other network.

In step 704 of FIG. 7, the EEC sends a service provisioning subscription request to the ECS. The ECS responds with a service provisioning subscription response, which includes the subscription identifier and may include the expiration time, indicating when the subscription will automatically expire.

When the DNS information is provisioned by the ECS, the UE can select DNS server based on the received DNS information.

In step 705 of FIG. 7, the PDU Session is established with C-UPF of 5GC.

In step 706a of FIG. 7, DNS Query for central application, supposed to be resolved in C-DNS server, is triggered in the UE.

In step 706b, C-DNS server is selected by the EEC or application as the DNS server for the DNS Query based on the DNS information received in step 703 and/or 703b.

In particular, the UE selects DNS server to be used for DNS resolution based on the received DNS information (and optionally additionally based on local DNS information). The DNS configuration support indication which is a standalone indication or a sub parameter of the DNS information (i.e. part of the DNS information) is also taken into consideration. The DNS information and the DNS configuration support indication can be transmitted from the ECS via the application layer and/or via the network layer. The DNS configuration support indication can be set by the UE (e.g. transmitted in step 701) or received from the ECS directly via application layer or indirectly via network layer (in step 703 or 703b). The local DNS information can be clarified into application layer information or network layer information (which may be stored in the UE OS in implementation). Examples are given as follows:

If the DNS information and the DNS configuration support indication is received via the application layer from the ECS, and the DNS configuration support indication indicates that the DNS configuration received via application layer is preferred or has higher precedence, and if optionally, the DNS information and the DNS configuration support indication is also received via network layer from the ECS, and the DNS configuration support indication indicates that the DNS configuration received via network layer is less preferred or has lower precedence, then, the UE uses the DNS information received via the application layer with higher precedence to select the DNS server for DNS resolution, which may override the DNS information received via the network layer.

For another example, if the DNS information and the DNS configuration support indication are received via the network layer from the ECS, and the DNS configuration support indication indicates that the DNS configuration received via network layer is preferred or has higher precedence, and if optionally, the DNS information and the DNS configuration support indication is received via the application layer from the ECS, and the DNS configuration support indication indicates that the DNS configuration received via the application layer is less preferred or has lower precedence, then, the UE uses the DNS information received via the network layer with higher precedence to select the DNS server for DNS resolution, which may override the DNS information received via the application layer.

As a whole, step 706b decides, when either or both the DNS information via the application layer and the DNS information via the network layer is/are received in step 703 and/or step 703b, which DNS information (the DNS information via the application layer or the DNS information via the network layer) is used for selecting the DNS server for DNS resolution. It is up to UE implementation on how the UE performs the overriding of the DNS information of the application layer (e.g. using the DNS information of network layer). For example, the DNS message is generated in the application layer based on the DNS information of the application layer, and the DNS message can be redirected to the DNS server included in the DNS information of the network layer. Alternatively, the DNS information of the application layer is sent to the network layer of the UE (which can also be OS (Operating System) of the UE), the DNS message is generated on the network layer (which can also be the OS of the UE) considering DNS information overriding the DNS information of the application layer. As another alternative, the DNS message is generated in the application layer based on the DNS information of the application layer, and the DNS server used in DNS message can be changed to the DNS server included in the DNS information of the network layer in the network layer of the UE (which can also be the OS of the UE). It is also up to UE implementation on how the UE performs the using of the DNS information of the application layer. For example, the DNS message is generated in the application layer based on the DNS information of the application layer, and sent to the selected DNS server. Alternatively, the DNS information of the application layer is sent to the network layer of the UE (which can also be OS (Operating System) of the UE), the DNS message is generated on the network layer (which can also be the OS of the UE) using the DNS information of the application layer.

In step 706c, The DNS query is sent to the C-DNS server. In step 706d, DNS response is received.

In step 707 of FIG. 7, the ECS may utilize the capabilities (e.g. UE location) of the 3GPP core network to retrieve the latest UE location information.

In step 708 of FIG. 7, local UPF insertion to access local DN happens. For example, a PDU session needs to access the local DN (e.g. the MEC), which leads to that a local PSA is inserted (replaced) to access the local DN (e.g. the MEC).

In step 709 of FIG. 7, an event occurs at the ECS that satisfies trigger conditions for updating service provisioning of a subscribed EEC, e.g. based on the UE location update received in step 707. The trigger can alternatively be other cases, e.g. the policy change on the application server side, the performance or deployment condition change on the application server side.

In step 710 of FIG. 7, if a service provisioning subscription request is sent from the EEC and the subscription is valid (i.e. the expiration time does not expire) in step 704, the ECS sends a service provisioning notification to the EEC with the list of EDN configuration information determined. Updated DNS information may be included in the service provisioning notification. Similar to step 703, the updated DNS information can be transmitted to the UE via application layer. Alternatively or additionally, the updated DNS information can be transmitted to the UE indirectly via network layer similar to steps 703a, 703b and 703c. As an example, when the updated DNS information is sent via the network layer, the ECS sends the updated DNS information to 5GC via AF (Application Function) update or parameter provisioning procedure, and the 5GC provides the updated DNS information to the UE via network layer by e.g. NAS PCO, UE policy rule or RA message.

In step 711a of FIG. 7, DNS Query for local application, supposed to be resolved in L-DNS server, is triggered in the UE.

In step 711b of FIG. 7, the related L-DNS server is selected as the DNS server for the DNS Query based on the DNS information received in step 703 and/or 703b. Similar to step 706b, step 711b decides, when at least one of the DNS information via the application layer is received in step 703, the DNS information via the network layer is received in step 703b, and the updated DNS information via the application layer or via network layer is received in step 710, which DNS information (the DNS information via the application layer received in step 703 or the DNS information via the network layer received in step 703b or the updated DNS information received in step 710) is used for selecting the DNS server for DNS resolution. The address of L-DNS server is used as the DA for the DNS query message.

In step 711c, DNS query is sent to the L-DNS server for resolution.

In step 711d of FIG. 7, DNS response is received from the L-DNS server.

It can be seen from the first embodiment that the DNS information provisioning can be performed in the service provisioning procedure. The DNS information can be provisioned either via application layer and/or via network layer depending on the DNS configuration support indication. The DNS information provisioning can be implemented in a Request/Response model (e.g. request in step 701 and response in step 703 (or in steps 703a, 703b and 703c), and/or in a subscribe/Notify model (e.g. subscribe in step 704 and notify in step 710).

According to a second embodiment, the application layer architecture illustrated in FIG. 4 is still used. The DNS configuration is provisioned by EES. The second embodiment assumes that the EEC has received service provisioning information from the ECS, including information for accessing the EES; the EEC has been authorized to access the EES; and the DNS information has been configured to the EES.

Figure 8:
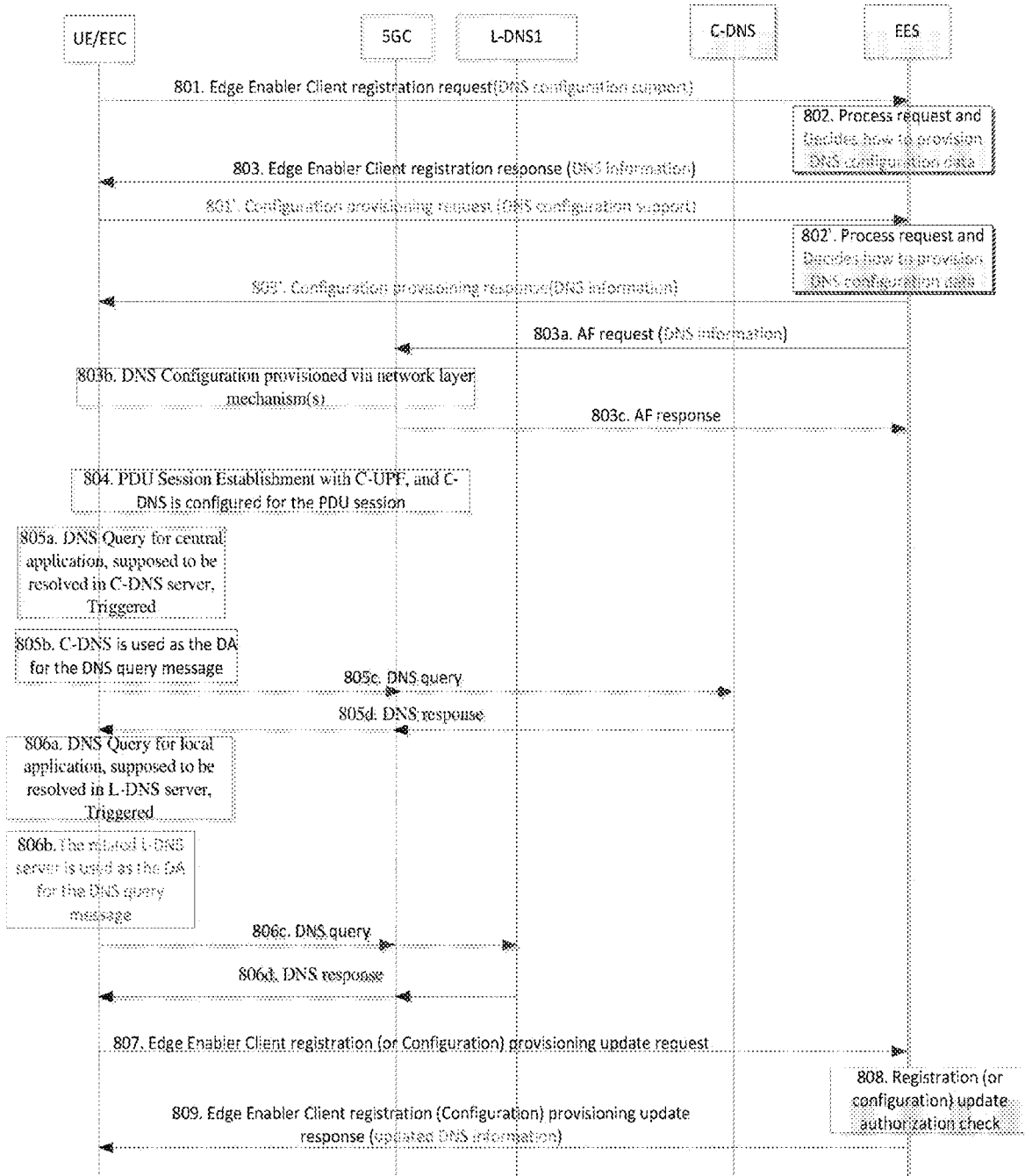
FIG. 8 illustrates procedures according to a second embodiment.

In step 801 of FIG. 8, the EEC sends Edge Enabler Client registration request to the EES. The request includes the security credentials received after successful authorization for edge computing services and may include a proposed expiration time. A DNS configuration support indication may be included to indicate the EES that how the EEC (or UE) supports handling DNS configuration. The DNS configuration support indication may be included in the Application Client Profile(s) as shown in Table 1.

The DNS configuration support indication indicates the support of the DNS configuration. The preferred way for using DNS information can also be optionally included or implied in the DNS configuration support indication.

In step 802 of FIG. 8, upon receiving the request from the EEC, the EES validates the registration request and verifies the security credentials. The EES further determines whether the requirements that are indicated in the Application Client Profile(s) can be fulfilled.

Similar to the first embodiment, if the DNS configuration support indication is not included in the Edge Enabler Client registration request, the EES (Note that the EES can be regarded as the server side) can decide the DNS configuration support indication for the UE. Even if the DNS configuration support indication is included in the Edge Enabler Client registration request, the EES (i.e. the server side) can decide another DNS configuration support indication for the UE to override the received DNS configuration support indication. Still similar to the first embodiment, the preferred way for using DNS information can be decided by the EES (i.e. the server side), if the preferred way for using DNS information is not received, or to override the received preferred way for using DNS information.

The EES (i.e. the server side) may decide the DNS configuration support indication or the preferred way for configuring DNS information based on the policy of application on the server said (e.g. provided by the EES provider) and/or the indication from the UE.

Based on the DNS configuration support indication either received from the UE or decided on the server side, the EES decides how to provision DNS configuration data (DNS information) (step 802). In particular, the EES should transmit the DNS information to the UE (or EEC) via the preferred way. Optionally, the ECS may also transmit the DNS information to the UE (or EEC) via the less preferred way. The DNS configuration support indication (decided by the EES) indicating the UE that the DNS information received via the preferred way has higher precedence or the DNS information received via the less preferred way has lower precedence, or the preferred way for using DNS information may be optionally included in the DNS information transmitted to the UE (or EEC), as part of the DNS information or as a standalone parameter. The DNS information, and/or DNS configuration support indication or the preferred way for using DNS information listed above are transmitted to the EEC or the network, means that the related information is generated by the EES and provided to the EEC or the network.

The DNS configuration support indication received from the UE or provided by the EES to be transmitted to the EEC or the network can have different names or can be packaged into different parameters. In any cases, it indicates how the EEC (or UE) supports handling DNS configuration, e.g. the UE preference of whether to use the DNS information received from the server (EES) or to use the DNS information received from the network.

Step 803 describes that the EES provides the DNS configuration data via application layer. Steps 803*a*, 803*b* and 803*c* describe that the EES provides the DNS configuration to the UE indirectly via the network layer e.g. 5G network, optionally with the DNS configuration support indication indicating the UE that the DNS configuration received via network layer has higher precedence or lower precedence.

In step 803 of FIG. 8, the EES sends a successful registration response, which includes the registration ID and may include a newly assigned EEC context ID. The EES may also provide an expiration time to indicate to the EEC when the registration will automatically expire. The DNS information (i.e. DNS configuration) is included in the Edge Enabler Client registration response. The DNS information identifies and configures one or more DNS servers for at least one application. In particular, the DNS information includes a list of DNS servers for the applications, e.g. FQDNs. Optionally, the DNS information further includes related validation criteria. For example, the DNS information indicates that all the local DNS servers serving the applications deployed within the EES is configured to the UE.

In steps 801, 802 and 803 of FIG. 8, the DNS information is provided in the EEC registration procedure. Alternatively, the DNS information can be provided in a separate procedure different from the EEC registration procedure, e.g. in a configuration provisioning procedure.

The configuration provisioning procedure is described with reference to steps 801', 802' and 803'.

In step 801' of FIG. 8, the EEC sends configuration provisioning request to the EES. A DNS configuration support indication may be included to indicate the EES that how the EEC (or UE) supports handling DNS configuration. The DNS configuration support indication may be included in the Application Client Profile(s) as shown in Table 1.

In step 802' of FIG. 8, the EES validates the request and decides how to provide DNS configuration data similar to step 802.

In step 803' of FIG. 8, if the EES makes decision for providing DNS configuration data via application layer in step 802', the EES sends Configuration provisioning response including the DNS information to the EEC.

In step 803*a* of FIG. 8, if the EES makes decision for providing DNS configuration data via network layer in step 802 or 802', and the EES gets the DNS configuration data, the EES interacts with 5GC via an Application Function (AF) request or parameter provisioning procedure.

In step 803*b* of FIG. 8, the 5GC provides the DNS configuration data to the UE via network layer way, by e.g. NAS PCO, UE policy rule or RA message.

In step 803*c* of FIG. 8, the 5GC responds the EES.

In step 804 of FIG. 8, the PDU Session is established with C-UPF and the C-DNS server can be configured for the PDU session based on the existing DNS configuration for the PDU session.

In step 805*a* of FIG. 8, DNS Query for central application, supposed to be resolved in C-DNS server, is triggered in the UE.

In step 805*b* of FIG. 8, the UE selects DNS server to be used for DNS resolution based on the received DNS information (and optionally additionally based on local DNS information). The DNS configuration support indication which is a standalone indication or a sub parameter of the DNS information (i.e. part of the DNS information) is also taken into consideration. The DNS information and the DNS configuration support indication can be transmitted from the EES via the application layer and/or via the network layer. The DNS configuration support indication can be set by the UE (e.g. transmitted in step 801 or 801') or received from the EES directly via application layer (in step 803 or 803') or indirectly via network layer (in step 803*b*). The local DNS information can be clarified into application layer information or network layer information (which may be stored in the UE OS in implementation). When at least one of the DNS information via the application layer is received in step 803 or step 803' and the DNS information via the network layer is received in step 803*b*, step 805*b* decides which DNS information (the DNS information via the application layer or the DNS information via the network layer) is used for selecting the DNS server for DNS resolution.

It is up to UE implementation on how the UE perform the overriding of the DNS information of the application layer (e.g. using the DNS information of network layer). For example, the DNS message is generated in the application layer based on the DNS information of the application layer, and the DNS message can be redirected to the DNS server included in the DNS information of the network layer. Alternatively, the DNS information of the application layer is sent to the network layer of the UE (which can also be OS (Operating System) of the UE), the DNS message is generated on the network layer (which can also be the OS of the UE) considering DNS information overwriting the DNS information of the application layer. As another alternative, the DNS message is generated in the application layer based on the DNS information of the application layer, and the DNS server used in DNS message can be changed to the DNS server included in the DNS information of the network layer in the network layer of the UE (which can also be the OS of the UE). It is also up to UE implementation on how the UE performs the using of the DNS information of the application layer. For example, the DNS message is generated in the application layer based on the DNS information of the application layer, and sent to the selected DNS server. Alternatively, the DNS information of the application layer is sent to the network layer of the UE (which can also be OS (Operating System) of the UE), the DNS message is generated on the network layer (which can also be the OS of the UE) using the DNS information of the application layer.

Accordingly, C-DNS is selected based on the DNS information received in step 803 and/or 803' and/or 803*b*. The C-DNS is used as the DNS server for the DNS resolution for the application, which may override the operator-provided DNS settings. The address of C-DNS is used as the DA for the DNS query message.

In step 806*a* of FIG. 8, DNS Query for local application, supposed to be resolved in L-DNS server, is triggered in the UE.

In step 806*b*, when at least one of the DNS information via the application layer is received in step 803 or step 803' and the DNS information via the network layer is received in step 803*b*, step 806*b* decides which DNS information (the DNS information via the application layer or the DNS information via the network layer) is used for selecting the DNS server for DNS resolution. Accordingly, the related L-DNS server is selected as the DNS server for the DNS Query based on the DNS information received in step 803 and/or 803' and/or 803*b*. The address of L-DNS server is used as the DA for the DNS query message.

In step 806*c*, DNS query is sent to the L-DNS for resolution.

In step 806*d*, DNS response is received from the L-DNS.

The DNS information can be updated in an Edge Enabler Client registration provision update procedure (or Edge Enabler Client configuration provision update procedure). For example, in step 807 of FIG. 8, an Edge Enabler Client registration (or configuration) provision update request is sent from EEC to EES. In step 808, the EES performs an authorization check of the registration (or configuration) update. If the authorization check is successful, in step 809, an Edge Enabler Client registration (or configuration) provision update response is sent from the EES to the EEC, and the updated DNS information is included in the response.

If the DNS information update is triggered by the EES, the DNS information can also be updated in a procedure such as notification from EES to EEC which requires the subscription of the update.

Similar to step 803 (803'), the updated DNS information can be transmitted to the UE via the application layer. Alternatively or additionally, the updated DNS information can be transmitted to the UE indirectly via the network layer similar to steps 803*a*, 803*b* and 803*c*. As an example, when the updated DNS information is sent via the network layer, the EES sends the updated DNS information to 5GC via AF update or parameter provisioning procedure, and the 5GC provides the updated DNS information to the UE via network layer by e.g. NAS PCO, UE policy rule or RA message.

In the first embodiment, the DNS information can be sent to the EEC from the ECS by being included in the service provisioning notification (see step 710); and in the second embodiment, the DNS information can be sent to the EEC from the EES by being included in a notification. In a third embodiment, the DNS information included in a notification can be sent to the EEC via a notification service. In particular, the ECS or the EES provides the notification via one or more of an OEM notification service, an EDGE notification service (for example via Edge Notification Server (ENS), if it is deployed in MEC platform), a RESTful API and a web-socket Application Programming Interface (API) to the EEC. OEM notification service is defined as a possible way for pushing notification messages to end devices using cross-platform cloud solutions. The OEM Notification Service may be for example via Firebase Cloud Messaging (FCM) or via Apple Push Notification Service (APNS), which can be used for Android-based, iOS-based, and web applications. In this condition, it is not necessary for the UE to contain a web server. In such case, further parameters for the identification of the OEM notification service, for example the OEM Notification Service Name (e.g. FCM), OEM Notification Service Version & OEM Notification Service Token, notification URL are needed. EDGE notification service can be defined as a service at the EDGEAPP layer (consisting ECS, EES, EEC as defined in TS 23.558) which is used to push notifications between EES and/or ECS to the EEC. This can be done, for example, via allowing the mapping of a notification to a device specific OEM notification service, or to a web-socket API, or to a RESTful API. The EDGE notification service can be a service provided by an ENS or a new capability of ECS. A RESTful API (or RST API) is an architectural style for an application program interface (API) that uses HTTP requests to access and use data. That data can be used to GET, PUT, POST and DELETE data types, which refers to the reading, updating, creating and deleting of operations concerning resources. Web-socket API is an advanced technology that makes it possible to open a two-way interactive communication session between the user's client and a server. With this API, you can send messages to a server and receive event-driven responses without having to poll the server for a reply.

In the above described embodiments, L-DNS server can be included in the DNS server list, configured as the DNS server for applications, used as the DA for the DNS query message. The L-DNS server can be used in conjunction with an L-DNS resolver. That is, when the L-DNS resolver is deployed, when L-DNS server is included in the DNS server list, i.e. can be configured as the DNS server for local applications, the L-DNS resolver can be used as the DA for the DNS query message, while the L-DNS resolver forwards the DNS query message to the L-DNS server to resolute.

An application can have one or more deployments. For example, the application can be deployed centrally. In addition, the application can be also deployed in one or more edge platforms. For each deployment, the application may have a different preferred DNS server. In addition, one or more applications can be accessed in one PDU session. For example, if two applications are accessed in one PDU session, each of the two applications has a different preferred DNS server (e.g. due to different conditions, such as different deployments). Accordingly, according to the embodiments, the DNS information can identify and configure one or more DNS servers. For example, the DNS information may include a list of DNS servers for at least one application, wherein each application has one or more DNS servers (e.g. C-DNS server, LDNSR, L-DNS server, L-DNS resolver, etc) in different conditions. For example, for the application deployed centrally, the DNS query for the application can be sent to the C-DNS server or the LDNSR; for the application deployed locally in an edge platform, the DNS query can be sent to the L-DNS server or the L-DNS resolver or the LDNSR. Note that the application can be deployed locally in one or more edge platforms. When the application is deployed locally in one edge platform (e.g. edge platform1), the DNS query can be sent to the L-DNS server or the L-DNS resolver (e.g. L-DNS server1 or L-DNS resolver1) that is local to the one edge platform (e.g. edge platform1) or the LDNSR (that can forward the DNS query to the L-DNS server; note that the LDNSR can be deployed centrally, or it may be deployed locally). When the application is deployed locally in another edge platform (e.g. edge platform2), the DNS query can be sent to the L-DNS server or the L-DNS resolver (e.g. L-DNS server2 or L-DNS resolver2) that is local to the other edge platform (e.g. edge platform2), or the LDNSR (that can forward the DNS query to the L-DNS server). For another example, when two applications are accessed in one PDU session, the DNS server to which the DNS query for one of the two applications is sent and the DNS server to which the DNS query for the other of the two applications is sent can be included in one DNS information. Note that it is not necessary that the DNS server for each deployment of each application is separately configured. For example, all applications (or a group of applications) in one deployment (e.g. in one edge platform (e.g. edge platform1)) may be configured with the same DNS server (e.g. L-DNS server1 or L-DNS resolver1 or LDNSR).

Figure 9:
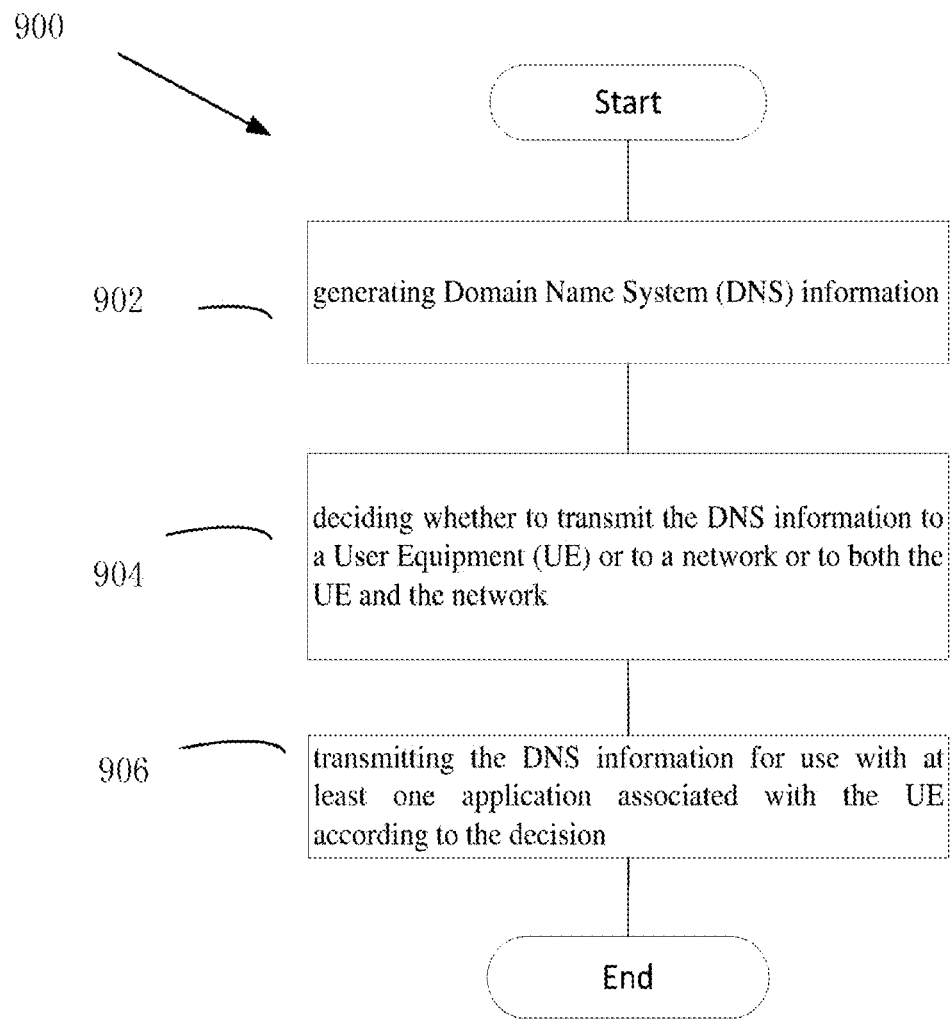
FIG. 9 illustrates is a schematic flow chart diagram illustrating an embodiment of a method.

FIG. 9 is a schematic flow chart diagram illustrating an embodiment of a method 900 according to the present application. In some embodiments, the method 900 is performed by a server, such as ECS or EES. In certain embodiments, the method 900 may be performed by a processor executing program code, for example, a microcontroller, a microprocessor, a CPU, a GPU, an auxiliary processing unit, a FPGA, or the like.

The method 900 may include 902 generating Domain Name System (DNS) information; 904 deciding whether to transmit the DNS information to a User Equipment (UE) or to a network, or to both the UE and the network; and 906 transmitting the DNS information for use with at least one application associated with the UE according to the decision.

Preferably, the method further comprises receiving a DNS configuration support indication from the UE, wherein the DNS configuration support indication indicates a preference of whether to use the DNS information transmitted from the server or to use the DNS information transmitted from the network. In addition, a DNS configuration support indication, which indicates a preference of whether to use the DNS information transmitted from the server or to use the DNS information transmitted from the network, is provided by the server and the DNS configuration support indication is included in the DNS information. The deciding whether to transmit the DNS information to the UE or to the network or to both the UE and the network is based on a DNS configuration support indication which may be the DNS configuration support indication received from the UE or the DNS configuration support indication decided by the server. The DNS configuration support indication decided by the server may be decided according to the server side policy and/or the DNS configuration support indication received from the UE.

The DNS information is used to identify and configure one or more DNS servers. The DNS information may further include validation criteria for the one or more DNS servers.

The server can be an Edge Configuration Server (ECS). Accordingly, the DNS information is transmitted to the UE as part of EDN configuration information, or part of EDN connection information, or part of Edge Enabler Servers configuration information.

The server can be an Edge Enabler Server (EES). Accordingly, the DNS information is transmitted to the UE as a new parameter indicating a related server configuration.

The DNS information may be alternatively transmitted to the UE via a notification service. The notification service comprises one or more of: an Original Equipment Manufacturer (OEM) notification service, an EDGE notification service, a web-socket Application Programming Interface (API), and a Representational State Transfer (RESTful) API.

The DNS information may be transmitted to a 5G Core (5GC) network via an Application Function (AF) request or parameter provisioning procedure. The 5GC network may transmit the DNS information via the network layer mechanism.

If an updated DNS information is generated, the updated DNS information can be transmitted to the UE either directly via the application layer or indirectly via the network layer.

Figure 10:
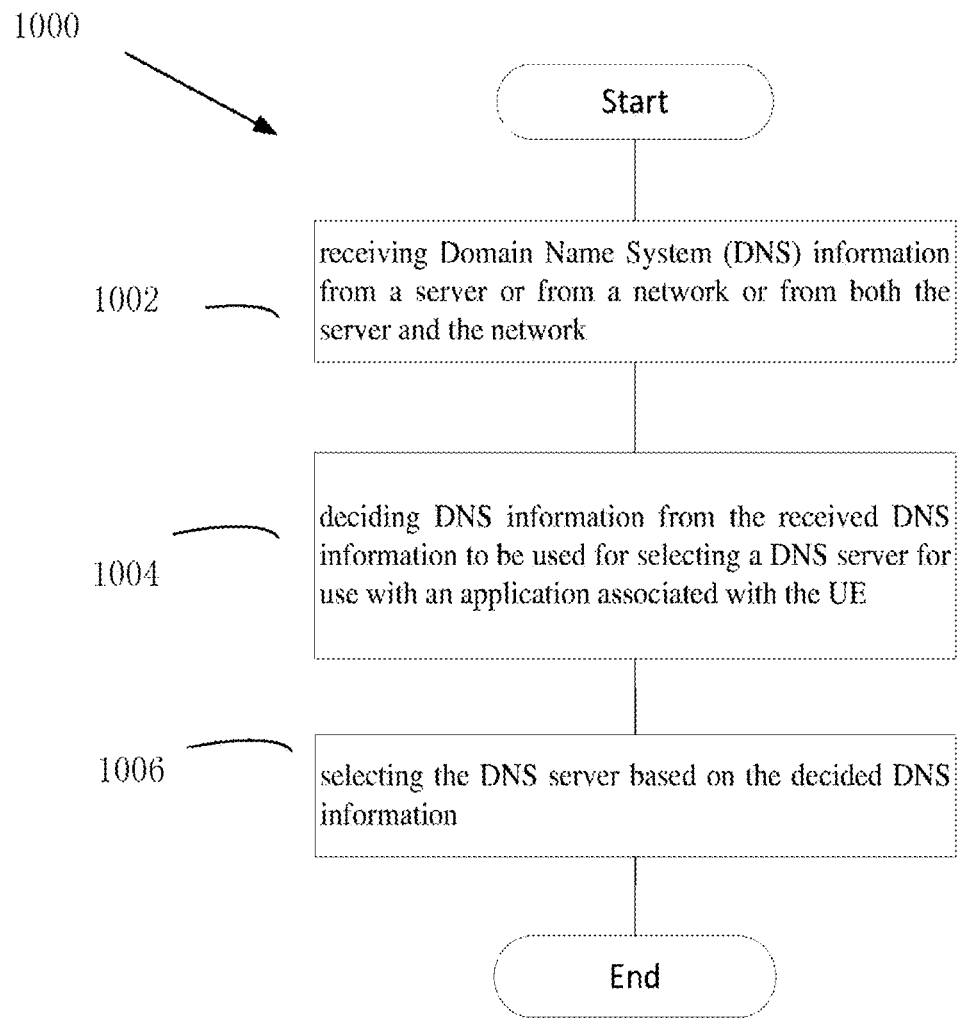
FIG. 10 is a schematic flow chart diagram illustrating a further embodiment of a method.

FIG. 10 is a schematic flow chart diagram illustrating an embodiment of a method 1000 according to the present application. In some embodiments, the method 1000 is performed by a UE. In certain embodiments, the method 1000 may be performed by a processor executing program code, for example, a microcontroller, a microprocessor, a CPU, a GPU, an auxiliary processing unit, a FPGA, or the like.

The method 1000 may include 1002 receiving Domain Name System (DNS) information from a server or from a network or from both the server and the network; 1004 deciding DNS information from the received DNS information to be used for selecting a DNS server for use with an application associated with the UE; and 1006 selecting the DNS server based on the decided DNS information.

Preferably, the method 1000 further comprises transmitting a DNS configuration support indication to the server, wherein the DNS configuration support indication indicates a preference of whether to use the DNS information received from the server or to use the DNS information received from the network. In addition, a DNS configuration support indication, which indicates a preference of whether to use the DNS information received from the server or to use the DNS information received from the network, is provided by the server and the DNS configuration support indication is included in the received DNS information. The DNS information to be used for selecting DNS server for DNS resolution may be decided based on a DNS configuration support indication, which can be the DNS configuration support indication transmitted to the server, and/or the DNS configuration support indication provided by the server (which is included in the received DNS information).

The received DNS information is used to identify and configure one or more DNS servers. In addition, the received DNS information may further include validation criteria for the one or more DNS servers.

The DNS information may be received from an Edge Configuration Server (ECS) as part of Edge Data Network (EDN) configuration information, or part of EDN connection information, or part of Edge Enabler Servers configuration information.

Alternatively, the DNS information may be received from an EES as a new parameter indicating a related server configuration.

Alternatively, the DNS information may be received from the server via a notification service. The notification service may comprise one or more of: an Original Equipment Manufacturer (OEM) notification service, an EDGE notification service, a web-socket Application Programming Interface (API), and a Representational State Transfer (RESTful) API.

In addition, updated DNS information may be received, either directly from the server via the application layer or indirectly from the network via the network layer.

With the decided DNS information, in response to a DNS query for the application being triggered, the DNS query can be sent to a C-DNS server or LDNSR; and in response to a DNS query for the application being triggered, the DNS query is sent to an L-DNS server or an L-DNS resolver or the LDNSR.

Figure 11:
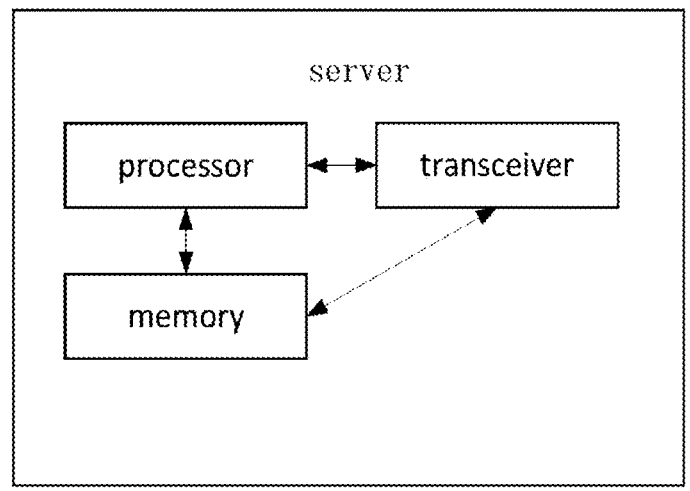
FIG. 11 is a schematic block diagram illustrating an apparatus according to one embodiment.

FIG. 11 is a schematic block diagram illustrating apparatuses according to one embodiment.

Referring to FIG. 11, the server (e.g. ECS or EES) includes a processor, a memory, and a transceiver. The processor implements a function, a process, and/or a method which are proposed in FIG. 9.

The server comprises a processor; and a transmitter coupled to the processor, wherein the processor is configured to generate Domain Name System (DNS) information, and to decide whether to transmit the DNS information to a User Equipment (UE) or to a network or to both the UE and the network; and the transmitter is configured to transmit the DNS information for use with at least one application associated with the UE according to the decision.

Preferably, the server further comprises a receiver coupled to the processor and configured to receive a DNS configuration support indication from the UE, wherein the DNS configuration support indication indicates a preference of whether to use the DNS information transmitted from the server or to use the DNS information transmitted from the network. In addition, a DNS configuration support indication, which indicates a preference of whether to use the DNS information transmitted from the server or to use the DNS information transmitted from the network, is provided by the server and the DNS configuration support indication is included in the DNS information. The processor is configured to decide whether to transmit the DNS information to the UE or to the network or to both the UE and the network based on a DNS configuration support indication which may be the DNS configuration support indication received from the UE or the DNS configuration support indication decided by the server. The DNS configuration support indication decided by the server may be decided according to the server side policy and/or the DNS configuration support indication received from the UE.

The DNS information is used to identify and configure one or more DNS servers. The DNS information may further include validation criteria for the one or more DNS servers.

The server can be an Edge Configuration Server (ECS). Accordingly, the DNS information is transmitted to the UE as part of EDN configuration information, or part of EDN connection information, or part of Edge Enabler Servers configuration information.

The server can be an Edge Enabler Server (EES). Accordingly, the DNS information is transmitted to the UE as a new parameter indicating a related server configuration.

The DNS information may be alternatively transmitted to the UE via a notification service. The notification service comprises one or more of: an Original Equipment Manufacturer (OEM) notification service, an EDGE notification service, a web-socket Application Programming Interface (API), and a Representational State Transfer (RESTful) API.

The DNS information may be transmitted to a 5G Core (5GC) network via an AF request procedure or a parameter provisioning procedure. The 5GC network may transmit the DNS information via the network layer mechanism.

If an updated DNS information is generated, the updated DNS information can be transmitted to the UE either directly via the application layer or indirectly via the network layer.

Figure 12:
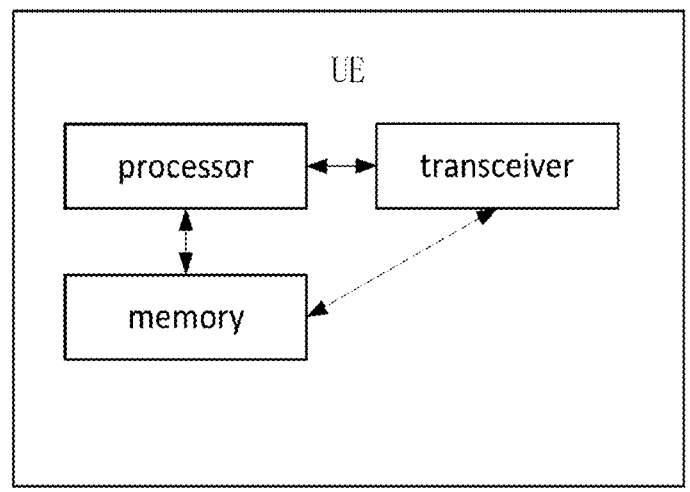
FIG. 12 is a schematic block diagram illustrating another apparatus according to one embodiment.

FIG. 12 is a schematic block diagram illustrating apparatuses according to one embodiment.

The UE includes a processor, a memory, and a transceiver. The processor implements a function, a process, and/or a method which are proposed in FIG. 10.

The UE comprises: a processor; and a receiver coupled to the processor, wherein the receiver is configured to receive Domain Name System (DNS) information from a server or from a network or from both the server and the network; and the processor is configured to decide DNS information from the received DNS information to be used for selecting a DNS server for use with an application associated with the UE; and to select the DNS server based on the decided DNS information.

Preferably, the UE may further comprise a transmitter coupled to the processor and configured to transmit a DNS configuration support indication to the server, wherein the DNS configuration support indication indicates a preference of whether to use the DNS information received from the server or to use the DNS information received from the network. In addition, a DNS configuration support indication, which indicates a preference of whether to use the DNS information received from the server or to use the DNS information received from the network, is provided by the server and the DNS configuration support indication is included in the received DNS information. The DNS information to be used for selecting DNS server for DNS resolution may be decided based on a DNS configuration support indication, which can be the DNS configuration support indication transmitted to the server, and/or the DNS configuration support indication provided by the server (which is included in the received DNS information).

The received DNS information is used to identify and configure one or more DNS servers. In addition, the received DNS information may further include validation criteria for the one or more DNS servers.

The DNS information may be received from an Edge Configuration Server (ECS) as part of Edge Data Network (EDN) configuration information, or part of EDN connection information, or part of Edge Enabler Servers configuration information.

Alternatively, the DNS information may be received from an EES as a new parameter indicating a related server configuration.

Alternatively, the DNS information may be received from the server via a notification service. The notification service may comprise one or more of: an Original Equipment Manufacturer (OEM) notification service, an EDGE notification service, a web-socket Application Programming Interface (API), and a Representational State Transfer (RESTful) API.

In addition, updated DNS information may be received, either directly from the server via the application layer or indirectly from the network via the network layer.

With the decided DNS information, in response to a DNS query for the application being triggered, the DNS query can be sent to a C-DNS server or LDNSR; and in response to a DNS query for the application being triggered, the DNS query is sent to an L-DNS server or an L-DNS resolver or the LDNSR.

Layers of a radio interface protocol may be implemented by the processors. The memories are connected with the processors to store various pieces of information for driving the processors. The transceivers are connected with the processors to transmit and/or receive message or information. Needless to say, the transceiver may be implemented as a transmitter to transmit the information and a receiver to receive the information.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed at a server, the method comprising:
   receiving, from a user equipment (UE), application information that indicates the UE supports receiving domain name system (DNS) information indirectly from the server via a network layer, wherein the application information corresponds to at least one application associated with the UE, and wherein the network layer connects the UE and a network entity;
   generating the DNS information for use with the at least one application associated with the UE, wherein the DNS information indicates one or more DNS servers associated with the at least one application;
   transmitting, based at least in part on the UE supporting receiving the DNS information indirectly from the server via the network layer, the DNS information to the network entity to indirectly indicate the DNS information via the network layer; and
   transmitting additional DNS information to the UE to directly indicate the additional DNS information via an application layer that connects the UE and the server, wherein at least one of the DNS information or the additional DNS information indicates a precedence of the DNS information or the additional DNS information.

2. The method of claim 1, wherein the application information further indicates that the UE supports receiving the additional DNS information directly from the server.

3. The method of claim 1, wherein at least one of the DNS information or the additional DNS information includes validation criteria for the one or more DNS servers.

4. The method of claim 1, wherein the server is an edge configuration server (ECS), and wherein transmitting the DNS information includes transmitting the DNS information as part of at least one of edge data network (EDN) configuration information, EDN connection information, or edge enabler servers configuration information.

5. The method of claim 1, wherein the server is an edge enabler server (EES), and wherein transmitting the DNS information includes transmitting the DNS information as a new parameter indicating a related server configuration.

6. The method of claim 1, wherein transmitting the DNS information includes transmitting the DNS information via a notification service.

7. The method of claim 1, wherein the network entity is a 5G core (5GC) network entity, and wherein the method further includes:
   transmitting the DNS information to the 5GC network entity via an application function (AF) request or a parameter provisioning procedure.

8. A user equipment (UE) for wireless communication, comprising:
   at least one memory; and
   at least one processor coupled with the at least one memory and configured to cause the UE to:
      transmit application information that indicates the UE supports receiving domain name system (DNS) information indirectly from a server via a network layer, wherein the application information corresponds to at least one application associated with the UE, and wherein the network layer connects the UE and a network entity;
      receive, via the network layer and based at least in part on the UE supporting receiving the DNS information indirectly from the server via the network layer, the DNS information from the network entity, wherein the DNS information is for use with the at least one application associated with the UE, and wherein the DNS information indicates one or more DNS servers associated with the at least one application;
      receive, via an application layer that connects the UE and the server, additional DNS information directly from the server, wherein at least one of the DNS information or the additional DNS information indicates a precedence of the DNS information or the additional DNS information; and
      select, based at least in part on the precedence of the DNS information or the additional DNS information, a DNS server from the one or more DNS servers based at least in part on the DNS information or the additional DNS information.

9. The UE of claim 8, wherein the application information further indicates that the UE supports receiving the additional DNS information directly from the server.

10. A method performed by a user equipment (UE), the method comprising:
- transmitting application information that indicates the UE supports receiving domain name system (DNS) information indirectly from a server via a network layer, wherein the application information corresponds to at least one application associated with the UE, and wherein the network layer connects the UE and a network entity;
- receiving, via the network layer and based at least in part on the UE supporting receiving the DNS information indirectly from the server via the network layer, the DNS information from the network entity, wherein the DNS information is for use with the at least one application associated with the UE, and wherein the DNS information indicates one or more DNS servers associated with the at least one application;
- receiving, via an application layer that connects the UE and the server, additional DNS information directly from the server, wherein at least one of the DNS information or the additional DNS information indicates a precedence of the DNS information or the additional DNS information; and
- selecting, based at least in part on the precedence of the DNS information or the additional DNS information, a DNS server from the one or more DNS servers based at least in part on the DNS information or the additional DNS information.

11. The method of claim 10, wherein the application information further indicates that the UE supports receiving the additional DNS information directly from the server.

12. A server for wireless communication, comprising:
at least one memory; and
at least one processor coupled with the at least one memory and configured to cause the server to:
- receive, from a user equipment (UE), application information that indicates the UE supports receiving domain name system (DNS) information indirectly from the server via a network layer, wherein the application information corresponds to at least one application associated with the UE, and wherein the network layer connects the UE and a network entity;
- generate the DNS information for use with the at least one application associated with the UE, wherein the DNS information indicates one or more DNS servers associated with the at least one application;
- transmit, based at least in part on the UE supporting receiving the DNS information indirectly from the server via the network layer, the DNS information to the network entity to indirectly indicate the DNS information via the network layer; and
- transmit additional DNS information to the UE to directly indicate the additional DNS information via an application layer that connects the UE and the server, wherein at least one of the DNS information or the additional DNS information indicates a precedence of the DNS information or the additional DNS information.

13. The server of claim 12, wherein the application information further indicates that the UE supports receiving the additional DNS information directly from the server.

14. The server of claim 12, wherein at least one of the DNS information or the additional DNS information includes validation criteria for the one or more DNS servers.

15. The server of claim 12, wherein the server is an edge configuration server (ECS), and wherein the DNS information is transmitted as part of at least one of edge data network (EDN) configuration information, EDN connection information, or edge enabler servers configuration information.

16. The server of claim 12, wherein the server is an edge enabler server (EES), and wherein to transmit the DNS information, the at least one processor is configured to cause the server to transmit the DNS information as a new parameter indicating a related server configuration.

17. The UE of claim 8, wherein at least one of the DNS information or the additional DNS information includes validation criteria for the one or more DNS servers.

18. The UE of claim 8, wherein the server is an edge configuration server (ECS), and wherein to receive the DNS information, the at least one processor is configured to cause the UE to receive the DNS information as part of at least one of edge data network (EDN) configuration information, EDN connection information, or edge enabler servers configuration information.

19. The UE of claim 8, wherein the server is an edge enabler server (EES), and wherein to receive the DNS information, the at least one processor is configured to cause the UE to receive the DNS information as a new parameter indicating a related server configuration.

20. The UE of claim 8, wherein to receive the DNS information, the at least one processor is configured to cause the UE to receive the DNS information via a notification service.

* * * * *